United States Patent Office 2,848,447
Patented Aug. 19, 1958

2,848,447
MONO-AZODYESTUFFS INSOLUBLE IN WATER

Herbert Kracker and Kurt Gengnagel, Offenbach (Main), Germany, assignors to Farbwerke Hoechst Aktiengesellschaft vormals Meister Lucius & Bruning, Frankfurt am Main, Germany, a corporation of Germany No Drawing. Application September 21, 1954
Serial No. 457,534

Claims priority, application Germany September 28, 1953

7 Claims. (Cl. 260—157)

The present invention relates to new mono-azodyestuffs insoluble in water and to fiber dyed therewith; more particularly it relates to azodyestuffs corresponding to the following general formula:

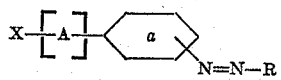

wherein X represents an alkyl, aryl, aralkyl or cycloalkyl radical, R stands for the radical of an aromatic or heterocyclic ortho-hydroxycarboxylic acid arylamide or acylacetic acid arylamide, A stands for the radical of 1.2.3.4-tetrazole of the following formula:

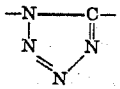

and wherein the phenyl nucleus $a$ may contain constituents.

We have found that valuable mono-azodyestuffs insoluble in water are obtained by coupling in substance, on a fiber or on a substratum adapted for the production of colour lakes the diazo-compounds of amines corresponding to the following general formula:

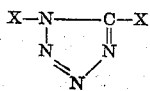

wherein one X stands for an aminophenyl radical which may contain substituents, and the other X stands for an alkyl, aryl, aralkyl or cycloalkyl radical, with coupling components usually applied in the ice colour industry, such as aromatic or heterocyclic ortho-hydroxycarboxylic acid arylamides or acylacetic acid arylamides, the components being free from groups imparting solubility in water, such as sulfonic acid groups or carboxylic acid groups.

As coupling components there are advantageously used the arylamides of 2-hydroxy-naphthalene-3-carboxylic acid, 2-hydroxy-anthracene-3-carboxylic acid, 3-hydroxy-diphenylene oxide-2-carboxylic acid, 2-hydroxy-carbazole-3-carboxylic acid, 5-hydroxy-1.2.1'.2'-benzocarbazole-4-carboxylic acid, acetoacetic acid and terephthaloyl-bis-acetic acid.

By the known dyeing processes valuable dyestuffs can be produced with the above mentioned components on vegetable fibers, including regenerated cellulose. In many cases, the dyeings so obtained are distinguished by good fastness to peroxide in addition to good general fastness properties.

Valuable dyeings of good fastness properties are likewise produced on acetyl cellulose fibers, polyamide fibers and polyurethane fibers.

The dyestuffs can also be prepared in substance or on a substratum and may be used for colouring high molecular plastic masses or for the production of colour lakes. They are also suitable for the production of coloured films by incorporating them in compositions containing cellulose esters or cellulose ethers. They may also be applied to textile materials by means of the pigment printing process.

In the process of this invention the diazo-components may also be used as stabilized diazo-compounds, especially as diazonium chloride-zinc chloride double salts, diazoamino-compounds or as antidiazotates according to one of the usual printing processes.

The derivatives of 1.2.3.4-tetrazole used as diazo-components in the present invention, which in part have not been described in the literature, may be prepared by known processes, for example, by reacting the imide chlorides obtainable from acylamino-nitrobenzenes, with hydronitric acid or by coupling diazotized amino-nitrobenzenes with N.N'-diacyl-hydrazines and subsequently reducing the nitro-compounds so obtained to the amino-compounds.

The following examples serve to illustrate the invention, but they are not intended to limit it thereto.

Example 1

50 grams of cotton yarn are treated for 45 minutes at 30° C. in the impregnating bath described below, centrifuged and introduced in the wet condition into the developing bath where dyeing is carried out at 20° C. The material is then rinsed, soaped at first for 15 minutes at 60° C., then for 15 minutes at 100° C. and dried.

Impregnating bath:
  7.5 grams of 1-(2'.3'-hydroxy-naphthoyl-amino)-2-methylbenzene are dissolved in
  18 cc. of denatured alcohol,
  4 cc. of sodium hydroxide solution of 38° Bé.,
  3.7 cc. of formaldehyde solution of 33 percent strength and
  11 cc. of warm water, and the solution is made up to 1 liter with water of 30° C.,
  5 grams of Monopol brilliant oil and
  10 cc. of sodium hydroxide solution of 38° Bé.

Developing bath:
  2.2 grams of 1-(3'-amino-4'-ethoxyphenyl)-5-methyl-1.2.3.4-tetrazole of the formula:

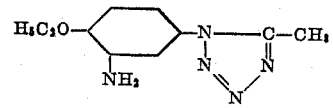

(melting point: 102–103° C.) (obtainable by reacting the imide chloride from 1-acetylamino-3-nitro-4-ethoxybenzene with hydronitric acid and reducing the 1-(3'-nitro-4'-ethoxyphenyl)-5-methyl-1.2.3.4-tetrazole so obtained to the corresponding amino compound) are dissolved with
  3 cc. of hydrochloric acid of 20° Bé. and
  20 cc. of water and the solution is mixed, while cooling, with a solution of
  0.75 gram of sodium nitrite in
  4 cc. of water. When the diazotization is complete, the solution is made up to 1 liter with cold water and
  1 gram of the reaction product of about 20 mols of ethylene oxide on oleyl alcohol.

A full red dyeing of good general fastness properties, especially of a good fastness to peroxide is obtained. The dyestuff corresponds to the following formula:

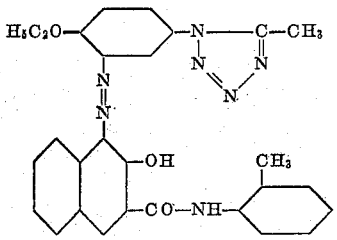

By using, instead of the impregnating bath described above, a bath which has been prepared in a corresponding manner by dissolving 5.5 grams of 1-(2'.3'-hydroxy-naphthoyl-amino)-2-methoxybenzene in
7.5 cc. of denatured alcohol,
4 cc. of sodium hydroxide solution of 38° Bé.,
3.7 cc. of formaldehyde solution of 33 percent strength and
11 cc. of warm water and then making up the solution to 1 liter, a bluish red dyeing having the same fastness properties is obtained.

Example 2

Acetate rayon is treated for 60 minutes at a goods-to-liquor ratio of 1:30 in a bath which contains per liter:

0.5 gram of 1-acetoacetylamino-2.5-dimethoxy-4-chlorobenzene and
0.44 gram of 1-(4'-amino-3'-methyl-6'-methoxyphenyl)-5-methyl-1.2.3.4-tetrazole of the formula:

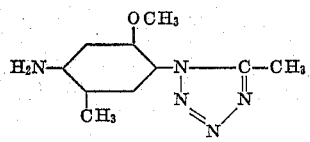

(melting point: 160–161° C.) dissolved in
2 cc. of a mixture consisting of equal parts of diglycol and monoethanolamine and
0.3 cc. of sodium hydroxide solution of 38° Bé. and to which have been added
10 grams of sodium chloride,
3 grams of a condensation product from fatty acids of high molecular weight and albumen decomposition products and
1 cc. of an ammonia solution of 25 percent strength.

The acetate rayon is then rinsed for a short time and diazotization is carried out at 10–15° C. in a bath containing per liter:

1 gram of sodium nitrite and
5 cc. of hydrochloric acid of 20° Bé.

The material is then treated at 60° C. with a solution containing per liter of water 2 grams of sodium acetate, soaped and rinsed. A greenish yellow dyeing of good fastness properties is obtained. The dyestuff corresponds to the following formula:

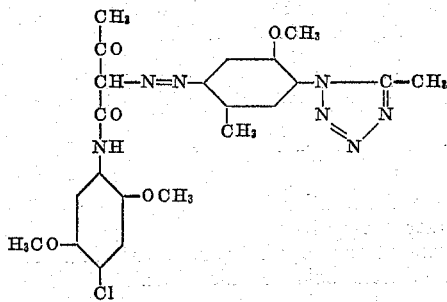

Example 3

Polyamide silk is treated for 60 minutes at 75° C. at a goods-to-liquor ratio of 1:30 in a bath which contains per liter:

0.5 gram of 1-(2'.3'-hydroxy-naphthoyl-amino)-2-methyl-4-methoxybenzene and
0.44 gram of 1-(3'-amino-4'-ethoxyphenyl)-5-methyl-1.2.3.4-tetrazole dissolved in
2 cc. of a mixture consisting of equal parts of diglycol and monoethanolamine and
0.4 cc. of sodium hydroxide solution of 38° Bé. and to which have been added
3 grams of sodium carbonate and
3 grams of a condensation product from fatty acids of high molecular weight and albumen decomposition products The polyamide silk is then rinsed for a short time and diazotization is carried out at 20° C. in a bath containing per liter:

2 grams of sodium nitrite and
5 cc. of hydrochloric acid of 20° Bé.

The material is then treated at 60° C. with a solution containing per liter of water:

4 grams of sodium acetate, soaped for 10 minutes at 80° C. in a solution containing per liter of water:

3 grams of soap and
2 grams of sodium carbonate, and rinsed.

A full red dyeing of good fastness properties is obtained.

Example 4

38 grams of the antidiazotate from 1-methyl-5-(2'-amino-5'-chlorophenyl)-1.2.3.4-tetrazole of the formula:

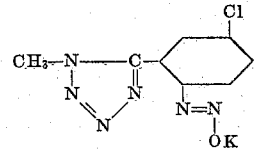

having a content of the base of 40.4 percent and 19.6 grams of 1-(2'.3'-hydroxy-naphthoyl-amino)-2-methoxybenzene are made into a paste with
30 cc. of sodium hydroxide solution of 38° Bé.,
20 grams of Turkey red oil,
20 cc. of denatured alcohol and
30 cc. of a sodium chromate solution of 30 percent strength, then dissolved with
352 cc. of water of 30° C. and the solution is stirred into
500 grams of starch-tragacanth thickening 60/1000.

With the printing paste so obtained cotton fabric is printed. The printed material is exposed to air overnight and the dyestuff is developed at 80–90° C. in a bath containing per liter 60 cc. of acetic acid of 8° Bé. and 25 grams of anhydrous sodium sulfate. The fabric is then passed through the air for a short time, repeatedly rinsed in the cold and soaped at the boil. An orange print is obtained which is distinguished by a good fastness to light, washing and chlorine and especially by a good fastness to peroxide.

Example 5

23.8 grams of 1-(2'.3'-hydroxy-naphthoyl-amino)-2.5-dimethoxy-4-chlorobenzene are made into a paste with
69.4 grams of the diazo-amino-compound from diazotized
1 - phenyl - 5 - (2' - aminophenyl) - 1.2.3.4 - tetrazole and 1-methylamino-2-carboxybenzene-4-sulfonic acid of the formula:

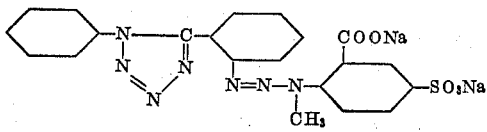

and a mixture consisting of:

40 cc. of sodium hydroxide solution of 38° Bé.,
30 grams of Monopol brilliant oil and
222 cc. of water of 30° C. and then stirred into
450 grams of starch-tragacanth thickening 60/1000.

The printing paste so obtained is applied to cotton material by machine or film printing. The fabric is exposed to the air overnight and the dyestuff is developed at 80–90° C. in a bath containing per liter 20 cc. of acetic acid of 50 percent strength,
5 cc. of formic acid of 85 percent strength and
25 grams of anhydrous sodium sulfate.

The material is then passed through the air for a short time, repeatedly rinsed in the cold and soaped at the boil. An orange print is obtained having good fastness properties, especially a good fastness to peroxide.

*Example 6*

28.7 grams of 1-(3'-amino-4'-ethoxyphenyl)-5-cyclohexyl-1.2.3.4-tetrazole of the formula:

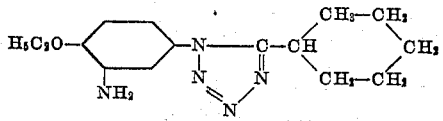

(melting point: 128–129° C.) are diazotized in the usual manner. The diazo-solution is rendered neutral to Congo-paper by the addition of sodium acetate and then stirred into a suspension of 39.3 grams of 1-(2'.3'-hydroxy-naphthoyl-amino)-2.5-dimethoxy-4-chlorobenzene which has been obtained by dissolving the latter compound in denatured alcohol and dilute sodium hydroxide solution and then precipitating it with acetic acid. When the coupling is complete, the dyestuff is filtered off with suction, thoroughly washed out and dried. It is a red powder.

With the dyestuff so obtained polymerization products from vinyl chloride can be dyed in the following manner:

70 parts by weight of a polymerization product from vinyl chloride,
30 parts by weight of phthalic acid-di-n-butylester, which acts as plasticizing agent,
0.2 part by weight of titanium dioxide and
0.3 part by weight of the azodyestuff are mixed and homogenized for 10 minutes at 140° C. on a kneading roll. A soft rubber-like mass of red coloration is obtained which possesses a good fastness to oil and light.

*Example 7*

50 grams of cotton yarn are treated for 45 minutes at 30° C. in the impregnating bath described below, centrifuged and introduced in the wet condition into the developing bath where dyeing is carried out at 15° C. The material is then rinsed, soaped at first for 15 minutes at 60° C., then for 15 minutes at 100° C. and dried.

Impregnating bath:
  1.75 grams of 1-(2'.3'-hydroxy-naphthoyl-amino)-2.5-dimethoxy-4-chlorobenzene are dissolved in
  1.75 cc. of denatured alcohol
  0.8 cc. of sodium hydroxide solution of 38° Bé.
  2.25 cc. of formaldehyde solution of 33 percent strength and
  3.5 cc. of warm water, and the solution is made up to 1 liter with water of 30° C.,
  5 grams of Monopol brilliant oil and
  10 cc. of sodium hydroxide solution of 38° Bé.

Developing bath:
  2.5 grams of 1-benzyl-5-(2'-aminophenyl)-1.2.3.4-tetrazole of the formula:

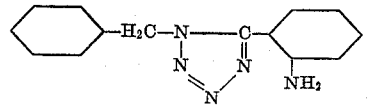

(melting point: 106° C.) (obtainable by reacting the imide chloride from 2-nitrobenzene-1-carboxylic acid-N-benzylamide with hydronitric acid and reducing the 1-benzyl-5-(2'-nitrophenyl)-1.2.3.4-tetrazole so obtained to the corresponding amino compound) are stirred with 5 cc. of an aqueous solution of the reaction product from ethylene oxide on oleyl alcohol in the proportion of 1:10 and, after the addition of
  4 cc. of hydrochloric acid of 20° Bé. mixed, while cooling, with a solution of
  0.75 gram of sodium nitrite in
  4 cc. of water. When the diazotization is complete, the solution is made up to 1 liter by adding cold water,
  1 gram of the reaction product from ethylene oxide on oleyl alcohol,
  1.5 grams of mono-sodium phosphate and
  7.1 grams of di-sodium phosphate.

An orange dyeing of good general fastness properties, especially of a good fastness to peroxide is obtained.

*Example 8*

50 grams of cotton yarn are treated as described in Example 7 while using the impregnating and developing baths described below.

Impregnating bath:
  7 grams of 2.3-hydroxy-naphthoyl-aminobenzene are dissolved in
  7 cc. of denatured alcohol,
  3.5 cc. of sodium hydroxide solution of 38° Bé.,
  7 cc. of formaldehyde solution of 33 percent strength and
  11 cc. of warm water, and the solution is made up to 1 liter with water of 30° C.,
  5 grams of Monopol brilliant oil and
  10 cc. of sodium hydroxide solution of 38° Bé.

Developing bath:
  2.8 grams of 1-(3'-amino-4'-ethoxyphenyl)-5-phenyl-1.2.3.4-tetrazole of the formula:

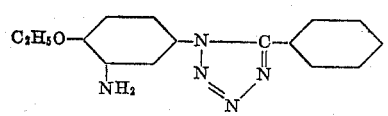

(melting point: 101° C.) are stirred with
  4 cc. of hydrochloric acid of 20° Bé. and
  50 cc. of water and mixed, while cooling, with a solution of
  0.8 gram of sodium nitrite in
  4 cc. of water. When the diazotization is complete, the solution is made up to 1 liter by adding cold water,
  1 gram of the reaction product of ethylene oxide on oleyl alcohol,
  1.5 grams of mono-sodium phosphate and
  7.1 grams of di-sodium phosphate.

A scarlet dyeing of good general fastness properties, especially of a good fastness to peroxide is obtained.

In the following table are given further components which can be used according to this invention, and the tints of the mono-azodyestuffs so obtained, which dyestuffs likewise possess good fastness properties.

| | Diazo-component | Azo-component | Fibrous Material | Tint |
|---|---|---|---|---|
| 1 | 1-(4'-aminophenyl)-5-methyl-1.2.3.4-tetrazole (melting point: 146-148° C.). | 1-(2'.3'-hydroxy-naphthoyl-amino)-benzene. | cotton | scarlet. |
| 2 | 1-(3'-amino-4'-methyl-phenyl)-5-methyl-1.2.3.4-tetrazole (melting point: 150-151° C.). | 2-methyl-4-chloro-benzene | do | yellowish red. |
| 3 | 1-(3'-amino-2'-methyl-phenyl)-5-methyl-1.2.3.4-tetrazole (melting point: 167-168° C.). | 2.5-dimethoxy-4-chlorobenzene | do | red. |
| 4 | 1-(3'-amino-4'.6'-dimethylphenyl)-5-methyl-1.2.3.4-tetrazole (melting point: 107-108° C.). | 1-(2'-hydroxyanthracene-3'-carboyl-amino)-2-methylbenzene. | do | bluish bordeaux. |
| 5 | 1-(3'-amino-2'.4'-dimethylphenyl)-5-methyl-1.2.3.4-tetrazole (melting point: 117-118° C.). | 1-(5'-hydroxy-1'.2'.1''.2''-benzocarbazole-4'-carboyl-amino)-4-methoxybenzene. | do | garnet. |
| 6 | 1-(3'amino-4'-methoxy-phenyl-)5-methyl-1.2.3.4-tetrazole (melting point: 123-124° C.). | 1-(2'.3'-hydroxy-naphthoyl-amino)-2.5-dimethoxy-4-chlorobenzene. | do | yellowish red. |
| 7 | 1-(3'-amino-4'-ethoxy-phenyl)-5-methyl-1.2.3.4-tetrazole (melting point: 102-103° C.). | 2-methyl-4-methoxy-benzene | polyamide fiber | red. |
| 8 | 1-(4'-amino-2'.5'-dimethoxyphenyl)-5-methyl-1.2.3.4-tetrazole (melting point: 149-150° C.). | naphthalene | cotton | bordeaux. |
| 9 | 1-(4'-amino-2'.5'-diethoxyphenyl)-5-methyl-1.2.3.4-tetrazole (melting point: 97-98° C.). | 2-methylbenzene | do | bluish bordeaux. |
| 10 | 1-(4'-amino-3'-methyl-6'-methoxyphenyl)-5-methyl-1.2.3.4-tetrazole (melting point: 160-161° C.). | 1-acetoacetylamino-2.5-dimethoxy-4-chlorobenzene. | acetyl cellulose | greenish yellow. |
| 11 | 1-(4'-amino-2'-methyl-5'-methoxyphenyl)-5-methyl-1.2.3.4-tetrazole (melting point: 139-140° C.). | 1-(2'-hydroxy-anthracene-3'-carboyl-amino)-2-methylbenzene. | cotton | violet. |
| 12 | 1-(4'-amino-3'-chloro-phenyl)-5-methyl-1.2.3.4-tetrazole (melting point: 155-156° C.). | 1-(2'.3'-hydroxy-naphthoylamino)-2-methyl-4-chlorobenzene. | do | brown-red. |
| 13 | 1-(2'-amino-4'.5'-dichlorophenyl)-5-methyl-1.2.3.4-tetrazole (melting point: 203-204° C.). | 2-(2'.3'-hydroxy-naphthoylamino)-3-methoxy-diphenylene-oxide. | do | claret. |
| 14 | 1-(4'-amino-2'-methyl-5'-chlorophenyl)-5-methyl-1.2.3.4-tetrazole (melting point: 179-180° C.). | 1-(3'-hydroxy-diphenylene-oxide-2'-carboylamino)-2.5-dimethoxybenzene. | do | brown. |
| 15 | 1-(4'-amino-2'-methoxy-5'-chlorophenyl)-5-methyl-1.2.3.4-tetrazole (melting point: 168-169° C.). | 1-(2'.3'-hydroxy-naphthoylamino)-benzene. | do | red-orange. |
| 16 | 1-(4'-aminophenyl)-5-n-propyl-1.2.3.4-tetrazole (melting point: 83-84° C.). | 4.4'-bis-(2''.3''-hydroxynaphthoyl-amino)-3.3'-dimethyl-di-phenyl. | do | full brown. |
| 17 | 1-(3'-amino-4'-methoxy-phenyl)-5-n-propyl-1.2.3.4-tetrazole (melting point: 90-91° C.). | 1-(2'.3'-hydroxy-naphthoylamino)-2-methylbenzene. | do | clear claret. |
| 18 | 1-(3'-amino-5'-ethoxy-phenyl)-5-n-propyl-1.2.3.4-tetrazole (melting point: 81-82° C.). | 2-(2'.3'-hydroxy-naphthoylamino)-naphthalene. | do | clear red. |
| 19 | 1-(4'-amino-2'.5'-dimethoxyphenyl)-5-n-propyl-1.2.3.4-tetrazole (melting point: 131-132° C.). | 1-(3'-hydroxy-naphthoylamino)-naphthalene.; | do | claret. |
| 20 | 1-(4'-amino-2'.5'-diethoxy-phenyl)-5-n-propyl-1.2.3.4-tetrazole (melting point: 73-74° C.). | 1-(6'-bromo-2'.3'-hydroxynaphthoyl-amino)-2-methoxybenzene. | do | bluish bordeaux. |
| 21 | 1-(4'-aminophenyl)-5-cyclohexyl-1.2.3.4-tetrazole (melting point: 152-153° C.). | 1-(2'.3'-hydroxy-naphthoylamino)-2-methoxy-5-chloro-benzene. | do | scarlet. |
| 22 | 1-(3'-amino-4'-methoxy-phenyl)-5-cyclohexyl-1.2.3.4-tetrazole (melting point: 145-146° C.). | 2-(2'.3'-hydroxy-naphthoylamino)-3-methoxy-diphenylene-oxide. | do | full red. |
| 23 | 1-(3'-amino-4'-ethoxy-phenyl)-5-cyclohexyl-1.2.3.4-tetrazole (melting point: 128-129° C.). | naphthalene | do | Do. |
| 24 | 1-(4'-amino-2'.5'-dimethoxyphenyl)-5-cyclohexyl-1.2.3.4-tetrazole (melting point: 156-157° C.). | 1-(2'.3'-hydroxy-naphthoylamino)-2-methoxybenzene. | do | bordeaux. |
| 25 | 1-(4'-amino-2'.5'-diethoxyphenyl)-5-cyclohexyl-1.2.3.4-tetrazole (melting point: 163-164° C.). | 2.4-dimethoxy-5-chlorobenzene | do | Do. |
| 26 | 1-methyl-5-(3'-amino-phenyl)-1.2.3.4-tetrazole (melting point: 159-160° C.). | 1-(2'.3'-hydroxy-naphthoylamino)-2-methyl-4-chlorobenzene. | do | scarlet. |
| 27 | 1-phenyl-5-(2'-amino-phenyl)-1.2.3.4-tetrazole (melting point: 162-163° C.). | 2.5-dimethoxy-4-chlorobenzene | do | yellowish scarlet. |
| 28 | 1-methyl-5-(3'-amino-4'-methylphenyl)-1.2.3.4-tetrazole (melting point: 180-181° C.). | 1-(2'.3'-hydroxy-naphthoylamino)-4-chlorobenzene. | do | bluish scarlet. |
| 29 | 1-phenyl-5-(2'-amino-4'-methylphenyl)-1.2.3.4-tetrazole (melting point: 144-145° C.). | 1-(2'-hydroxycarbazole-3'-carboyl-amino)-4-chlorobenzene. | do | yellowish brown. |
| 30 | 1-methyl-5-(2'-amino-5'-chlorophenyl)-1.2.3.4-tetrazole (melting point: 156-157° C.). | 1-(2'.3'-hydroxy-naphthoylamino)-2-methoxy-benzene. | do | orange. |
| 31 | 1-phenyl-5-(3'-amino-6'-chlorophenyl)-1.2.3.4-tetrazole (melting point: 162-163° C.). | 1-(2'-hydroxy-carbazole-3'-carboyl-amino(-4-chlorobenzene. | do | yellowish brown. |
| 32 | 1-methyl-5-(3'-amino-4'-methoxyphenyl)-1.2.3.4-tetrazole (melting point: 152-153° C.). | 1-(2'.3'-hydroxy-naphthoylamino)-2.4-dimethoxy-5-chloro-benzene. | do | bordeaux. |
| 33 | 1-n-butyl-5-(3'-amino-4'-ethoxyphenyl)-1.2.3.4-tetrazole (melting point: 62-63° C.). | 1-(2'.3'-hydroxy-naphthoylamino)-2.5-dimethoxy-4-chloro-benzene. | do | clear scarlet. |
| 34 | 1-phenyl-5-(3'-amino-4'-ethoxyphenyl)-1.2.3.4-tetrazole (melting point: 123-124° C.). | 1-(2'-hydroxycarbazole-3'-carboyl-amino)-4-chlorobenzene. | do | full yellow brown. |
| 35 | 1-methyl-5-(3'-amino-4'-ethoxyphenyl)-1.2.3.4-tetrazole (melting point: 118-119° C.). | terephthaloyl-bis-(1-acetylamino-3-chloro-4.6-dimethoxybenzene). | do | reddish yellow. |
| 36 | 1-n-butyl-5-(3'-amino-4'-methoxyphenyl)-1.2.3.4-tetrazole (melting point: 115-116° C.). | 1-(2'.3'-hydroxy-naphthoylamino)-2.4-dimethoxy-5-chloro-benzene. | do | full bluish red. |
| 37 | 1-phenyl-5-(3'-amino-4'-methoxyphenyl)-1.2.3.4-tetrazole (melting point: 108-109° C.). | 1-(2'.3'-hydroxy-naphthoylamino)-4-chlorobenzene. | do | bluish red. |
| 38 | 1-(4'-amino-2'.5'-diethoxy-phenyl)-5-phenyl-1.2.3.4-tetrazole (melting point: 164° C.). | terephthaloyl-bis-(1-acetylamino-2-methoxy-4-chloro-5-methylbenzene). | do | yellow. |

| | Diazo-component | Azo-component | Fibrous Material | Tint |
|---|---|---|---|---|
| 39 | 1-(3'-amino-4'-ethoxy-phenyl)-5-(4'-methylphenyl)-1.2.3.4-tetrazole (melting point: 122° C.). | 2.3-hydroxynaphthoyl-aminobenzene. | cotton | red. |
| 40 | 1-(3'-amino-4'-ethoxy-phenyl)-5-(3'-methoxy-phenyl)-1.2.3.4-tetrazole (melting point: 102° C.). | 1-(2'.3'-hydroxy-naphthoylamino)-4-chloro-benzene. | do | Do. |
| 41 | 1-(3'-amino-4'-ethoxyphenyl)-5-(4'-chlorophenyl)-1.2.3.4-tetrazole (melting point: 136° C.). | 1-(2'.3'-hydroxynaphthoylamino)-4-methoxybenzene. | do | Do. |
| 42 | 1-(4'-amino-2'.5'-diethoxyphenyl)-5-benzyl-1.2.3.4-tetrazole (melting point: 102° C.). | 2.3-hydroxynaphthoylaminobenzene. | do | garnet. |
| 43 | 1-cyclohexyl-5-(3'-amino-4'-methoxyphenyl)-1.2.3.4-tetrazole (melting point: 167° C.). | 1-(3'-hydroxydiphenylene-oxide-2'-carboylamino)-2.5-dimethoxybenzene. | do | greenish brown. |
| 44 | 1-benzyl-5-(2'-aminophenyl)-1.2.3.4-tetrazole (melting point: 106° C.). | 1-(2'.3'-hydroxynaphthoylamino)-2-methoxy-4-chloro-5-methylbenzene. | do | orange. |
| 45 | 1-(4'-chlorophenyl)-5-(2'-aminophenyl)-1.2.3.4-tetrazole (melting point: 175° C.). | 1-(2'.3'-hydroxynaphthoylamino)-2.5-dimethoxy-4-chlorobenzene. | do | Do. |
| 46 | 1-(4'-methylphenyl)-5-(2'-aminophenyl)-1.2.3.4-tetrazole (melting point: 164° C.). | 1-(2'.3'-hydroxynaphthoylamino)-2-methoxy-4-chloro-5-methylbenzene. | do | Do. |
| 47 | 1-ethyl-5-(4'-aminophenyl)-1.2.3.4-tetrazole (melting point: 141° C.). | 1-(2'.3'-hydroxynaphthoylamino)-2-ethoxybenzene. | do | scarlet. |
| 48 | 1-(4'-ethoxyphenyl)-5-(3'-amino-4'-methoxyphenyl)-1.2.3.4-tetrazole (melting point: 126° C.). | 2.3-hydroxynaphthoylaminobenzene. | do | bluish red. |
| 49 | 1-(2'-methoxyphenyl)-5-(3'-amino-4'-methoxyphenyl)-1.2.3.4-tetrazole (melting point: 187° C.). | 1-(5'-hydroxy-1'.2'.1''.2''-benzocarbazole-4'-carboylamino)-4-methoxy-benzene. | do | reddish black. |
| 50 | 1-methyl-5-(2'-amino-5'-chlorophenyl)-1.2.3.4-tetrazole (melting point: 156° C.). | 2-(2'.3'-hydroxynaphthoylamino)-3-methoxydiphenylene oxide. | do | red. |
| 51 | 1-(3'-amino-4'-ethoxyphenyl)-5-ethyl-1.2.3.4-tetrazole (melting point: 83° C.). | 1-(2'.3'-hydroxynaphthoylamino)-2-methoxybenzene. | do | bordeaux. |
| 52 | 1-(3'-amino-4'-ethoxyphenyl)-5-ethyl-1.2.3.4-tetrazole (melting point: 83° C.). | 1-(2'.3'-hydroxynaphthoylamino)-2-methylbenzene. | do | ruby-red. |
| 53 | 1-(3'-amino-4'-ethoxyphenyl)-5-ethyl-1.2.3.4-tetrazole (melting point: 83° C.). | 1-(2'.3'-hydroxynaphthoylamino)-2-methyl-4-methoxybenzene. | do | red. |
| 54 | 1-(4'-amino-2'.5'-diethoxyphenyl)-5-ethyl-1.2.3.4-tetrazole (melting point: 89° C.). | 2.3-hydroxynaphthoylaminobenzene. | do | claret. |
| 55 | 1-(2'-amino-4'.5'-dimethylphenyl)-5-ethyl-1.2.3.4-tetrazole (melting point: 152° C.). | 1-(2'.3'-hydroxynaphthoylamino)-2-methoxy-5-chlorobenzene. | do | scarlet. |

We claim:

1. The water-insoluble mono-azodyestuffs corresponding to the following general formula:

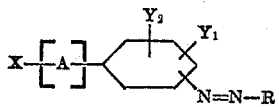

wherein X stands for a member selected from the group consisting of lower alkyl, benzyl, cyclohexyl, phenyl, methylphenyl, methoxyphenyl, ethoxyphenyl and chlorophenyl, $Y_1$ and $Y_2$ stand for members of the group consisting of hydrogen, methyl, methoxy, ethoxy and chlorine, R stands for the radical of a coupling component selected from the group consisting of arylamides of 2-hydroxy-naphthalene-3-carboxylic acid, 2-hydroxy-anthracene-3-carboxylic acid, 3-hydroxy-diphenylene oxide-2-carboxylic acid, 2-hydroxy-carbazole-3-carboxylic acid, 5-hydroxy-1.2.1'.2'-benzocarbazole-4-carboxylic acid, acetoacetic acid and terephthaloyl-bis-acetic acid, wherein the arylamides are selected from the group consisting of radicals of the benzene, naphthalene, diphenyl and diphenyleneoxide series, and A stands for the radical of 1.2.3.4-tetrazole of the following formula

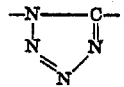

2. The water-insoluble mono-azodyestuffs corresponding to the following general formula

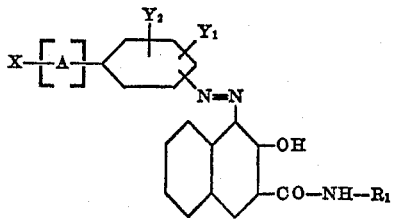

wherein X stands for a member selected from the group consisting of lower alkyl, benzyl, cyclohexyl, phenyl, methylphenyl, methoxyphenyl, ethoxyphenyl and chlorophenyl, $Y_1$ and $Y_2$ stand for members of the group consisting of hydrogen, methyl, methoxy, ethoxy and chlorine, $R_1$ stands for a member selected from the group consisting of radicals of the benzene and diphenylene oxide series, and A stands for the radical of 1.2.3.4-tetrazole of the following formula:

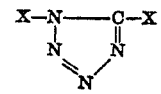

3. The water-insoluble mono-azodyestuff corresponding to the following formula:

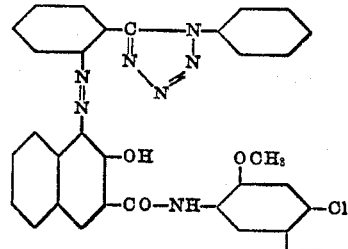

4. The water-insoluble mono-azodyestuff corresponding to the following formula:

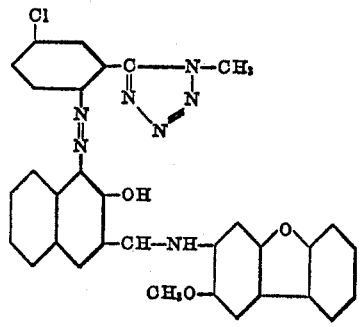

5. The water-insoluble mono-azodyestuff corresponding to the following formula:

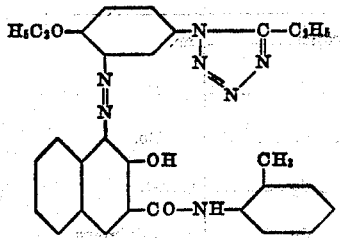

6. The water-insoluble mono-azodyestuff corresponding to the following formula:

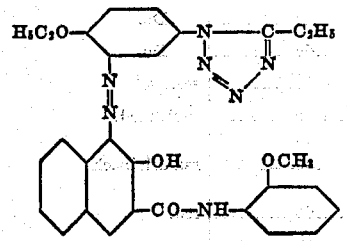

7. The water-insoluble mono-azodyestuff corresponding to the following formula:

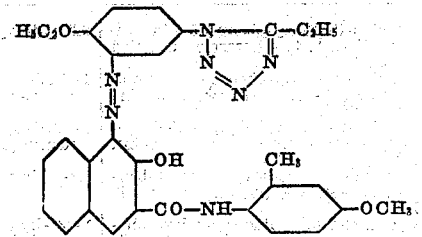

References Cited in the file of this patent

UNITED STATES PATENTS

| | | |
|---|---|---|
| 2,308,023 | Peterson | Jan. 12, 1943 |
| 2,346,531 | Allen et al. | Apr. 11, 1944 |
| 2,501,188 | Parker et al. | Mar. 21, 1950 |

OTHER REFERENCES

Benson: Chemical Reviews, August 1947, vol. 41, No. 1, pages 40–41.